(12) United States Patent
Loehr et al.

(10) Patent No.: US 6,856,940 B2
(45) Date of Patent: Feb. 15, 2005

(54) METHOD AND DEVICE FOR MONITORING THE FUNCTIONING OF A SYSTEM

(75) Inventors: Diethard Loehr, Holzmaden (DE); Axel Strommer, Brackenheim (DE)

(73) Assignee: Robert Bosch GmbH, Stuttgart (DE)

( * ) Notice: Subject to any disclaimer, the term of this patent is extended or adjusted under 35 U.S.C. 154(b) by 68 days.

(21) Appl. No.: 10/183,828

(22) Filed: Jun. 27, 2002

(65) Prior Publication Data

US 2003/0023405 A1 Jan. 30, 2003

(30) Foreign Application Priority Data

Jun. 27, 2001 (DE) .......................................... 101 30 655
May 10, 2002 (DE) .......................................... 102 20 812

(51) Int. Cl.[7] .............................................. G06F 11/30
(52) U.S. Cl. .................................................... 702/182
(58) Field of Search ................................ 702/182, 140, 702/50, 25, 188, 116; 340/3, 931, 107, 523; 382/107; 714/56; 315/326; 72/19; 131/58; 472/31; 187/406, 403; 318/568, 587, 4, 5; 700/96; 118/908; 322/15

(56) References Cited

U.S. PATENT DOCUMENTS

| | | | |
|---|---|---|---|
| 3,866,109 A | * 2/1975 | Reed et al. | .................... 322/15 |
| 5,448,722 A | 9/1995 | Lynne | |
| 5,500,944 A | 3/1996 | Yoshida | |
| 5,619,621 A | 4/1997 | Puckett | |
| 5,715,178 A | * 2/1998 | Scarola et al. | .............. 702/116 |
| 6,122,565 A | * 9/2000 | Wenning et al. | ............. 700/206 |
| 6,256,544 B1 | * 7/2001 | Weissinger | ..................... 700/1 |

FOREIGN PATENT DOCUMENTS

| | | |
|---|---|---|
| DE | 41 14 999 | 11/1992 |
| DE | 44 38 714 | 5/1996 |
| DE | 195 00 188 | 7/1996 |
| DE | 197 49 002 | 8/1998 |
| DE | 198 26 131 | 12/1999 |
| EP | 0 482 523 | 4/1992 |

OTHER PUBLICATIONS

French Search Report (for corresponding French case) dated Feb. 10, 2004 (English Translation provided).

* cited by examiner

Primary Examiner—John Barlow
Assistant Examiner—Tung S Lau
(74) Attorney, Agent, or Firm—Kenyon & Kenyon (57) ABSTRACT

A method of monitoring the functioning of a system by checking input signals, output signals, and functions of the system is provided. The system may have lower-level subsystems or may be a component of a higher-level system. The system has hardware components, including sensors, actuators, and/or function computers. A flexible structure, applicable to various systems to be monitored, is provided for the monitoring method. This monitoring method is structured into multiple decentralized monitoring functions provided in the individual functions of the system for monitoring the functioning of the individual functions, and structured into at least one higher-level, functions-overreaching monitoring instance for coordinating the monitoring functions.

21 Claims, 5 Drawing Sheets

METHOD AND DEVICE FOR MONITORING THE FUNCTIONING OF A SYSTEM

FIELD OF THE INVENTION

The present invention relates to a method of monitoring the functioning of a system by checking input signals, output signals, and functions of the system. The system may include lower-level subsystems or may be a component of a higher-level system. This system may include hardware components, such as sensors, actuators and/or function computers.

BACKGROUND INFORMATION

An exemplary embodiment according to the present invention relates to a memory element for a device for monitoring the functioning of a system. A computer program for execution on a computer, for example, on a microprocessor, is stored on the memory element. The memory element may be designed, for example, as a read-only memory, a random access memory or a flash memory.

In addition, an exemplary embodiment according to the present invention relates to a computer program for execution on a computer, for example, a microprocessor.

An exemplary device according to the present invention monitors the functioning of a system having lower-level subsystems or a device that is a component of a higher-level system. This system may have hardware components, including sensors, actuators and/or function computers. The device may also check input signals, output signals and functions of the system.

An exemplary automotive control device according to the present invention controls and/or regulates one or more functions in a motor vehicle. The functioning of the control device may be checked on the basis of input signals (from sensors or other control devices), output signals (for actuators or other control devices) and the functions of the control device. The control device may have subordinate subsystems, e.g., additional control devices for controlling and/or regulating the individual subfunctions of the vehicle. An example of a system having subordinate subsystems is an electric brake system of a vehicle. A higher-level control device determines how a preselectable braking force is distributed among the individual brake cylinders of the wheels. Subordinate control devices assigned to the brake cylinders of a wheel, for example, may control or regulate the driving of the brake cylinders.

To guarantee, or at least make more probable, the correct functioning of a system, the monitoring of input signals, output signals and functions of the system may be relied upon. German Published Patent Application No. 41 14 999 refers to a method of monitoring the functioning of an automotive control device. The intended function of the control device is executed in a microprocessor of the control device. In parallel, the same function is executed at least partially in a monitoring device. The output signals of the microcomputer and the monitoring device are compared and, depending on the result of this comparison, a determination is made as to whether the control device is functioning correctly. If faulty functioning of the control device is detected, appropriate substitute measures may be instituted. It is believed that this method is based on the hardware of the system to be monitored and is highly inflexible. If the proposed monitoring method is to be executed, for example, in another control device having another intended function, it is believed that the monitoring method will have to be completely revised and be adapted to the revised function of the other control device. German Published Patent Application No. 44 38 714 refers to a method of monitoring the functioning of a control device. A microcomputer of the control device is subdivided into a function level, a monitoring level, and a check level. The function of the control device is executed in the function level. In the monitoring level, the function executed may be checked, for example, by a threshold comparison or a plausibility check. In the monitoring level, the total function of the control device is therefore not executed, and instead only specific monitoring functions are executed. Nevertheless, to detect faulty functioning of the system with adequate reliability, the additional check level checks the hardware components of the system (e.g. memory elements), and may check correct functioning of the microprocessor using a question-answer communication. It is believed that this monitoring method has the disadvantage in that its structure is based on the hardware of the system to be monitored and is very inflexible. To apply the monitoring method to a different control device having a different intended function, it is believed that this monitoring method will first have to be completely revised and adapted to the new hardware and software conditions. However, this may be complicated and expensive.

SUMMARY OF THE INVENTION

An object of the present invention is to provide a method for monitoring and diagnosing systems that is applicable to other systems, without great effort.

To achieve this object, an exemplary embodiment according to the present invention structures the monitoring method:

into multiple decentralized monitoring functions provided in the individual functions of the system for monitoring the functioning of the individual functions, and into at least one higher-level monitoring instance in addition to the function for coordinating the monitoring functions.

It is believed that an exemplary system according to the present invention is describable by the functions contained therein, in which no distinction is made between the type of implementation (hardware or software). A monitoring function for monitoring the functioning of each function of the system to be monitored is assigned to that function. At least one additional higher-level monitoring instance coordinates the individual monitoring functions. Thus, it is believed that an exemplary embodiment according to the present invention relates to an advantageous horizontal structuring of the monitoring method for the system to be monitored.

Another exemplary embodiment according to the present invention designates a unit having at least one input and one output. Each input state of the function may be unambiguously assigned to an output state, and the function may be implemented as a hardware circuit or as a software construct.

According to still another exemplary embodiment of the present invention, the monitoring functions are organized into hierarchical structures. Each function independently ensures, or at least makes more probable, the reliability of the input signals it uses. Therefore, depending on which hierarchical layer it may be assigned to, the function may either access only those input signals it uses (as well as optional status information of upstream functions) or it may consider additional information from higher-level monitoring layers. This exemplary embodiment according to the present invention proposes a vertical structuring of the monitoring method for the system to be monitored.

According to yet another exemplary embodiment of the present invention, a higher-level monitoring function queries the status of the input signals in a lower-level monitoring function.

In the case of faulty functioning of the system, substitute measures may be implemented, the substitute measures being freely configurable for the respective faulty function. The substitute measures may be executed an addition to or in lieu of the intended function of the function monitored as soon as a fault is detected. Depending on the type of fault detected, a certain substitute measure may be selected, for example, by using a table, and then activated. Substitute measures triggered on the basis of a fault detected within a high-priority function are initiated before diagnosis of the fault and a fault entry.

If the system's functioning is faulty, substitute measures may be implemented in the closest possible proximity to the respective function that has been found to be faulty by the assigned monitoring function. Therefore, it may be ensured, or at least made more probable, that the substitute measures approximate the fault as closely as possible.

According to yet another exemplary embodiment of the present invention, the at least one higher-level monitoring instance coordinates the administration of a fault memory, for example, the writing and reading of entries into the fault memory. The fault memory may be read for analysis of the information contained therein either during operation of the control device or at a later point in time. The information analyzed may be considered in designing new systems.

According to still another exemplary embodiment of the present invention, the at least one higher-level monitoring instance requests or queries a status of monitoring in the individual monitoring functions. This status of monitoring of the individual monitoring functions may be relayed from the at least one higher-level monitoring instance to an external diagnostic test unit.

The at least one higher-level monitoring instance provides an interface for connecting a diagnostic testing unit for targeted triggering of individual components of the system. In this manner, for example, actuators of the monitored system may be triggered in a controlled manner.

The monitoring functions may detect local relevant ambient data for the individual functions and relay this data to the higher-level monitoring instance. Local ambient data for an electric battery management (EBM) control device may be, for example, the battery voltage. Detection of local ambient data may be triggered, for example, by the fault counter. At the time of a first incrementing of the counter, the local ambient data is detected. Decrementing of the counter causes the local ambient data to be reset. The ambient data detected in this manner is relayed to the higher-level monitoring instance only on an overwriting of the maximum counter status (e.g., on exceeding a specifiable threshold value in the transition from a disturbance to a fault). Ambient data is additional information (e.g., temperature), which is stored, together with the fault, and used for a subsequent analysis of the fault.

The at least one higher-level monitoring instance may centrally detect global ambient data. The lower-level monitoring functions provides the information on whether a fault exists. The higher-level monitoring instance then stores the current global ambient data, together with the fault. In some cases (for example, when the global data does not permit any conclusion regarding the fault), local ambient data may be transferred from the lower-level monitoring functions to the higher-level monitoring instance and stored, together with the fault. Global ambient data includes data that is relevant for special functions and for a plurality of other functions. An example of global ambient data is the ambient temperature or the temperature of an internal combustion engine of a motor vehicle.

Still another exemplary method according to the present invention, provides that the functioning of the individual functions be monitored in multiple decentralized monitoring functions provided in the individual functions of the system, and the monitoring functions be coordinated in at least one higher-level monitoring instance in addition to the individual function.

An exemplary method according to the present invention may be implemented in a memory element, which may be provided for a device for monitoring the functioning of a system. A computer program for execution on a computer, for example, on a microprocessor, and suitable for executing an exemplary method according to the present invention, is stored on the memory element, such that this memory element, provided with the computer program, is also an exemplary embodiment according to the present invention. For example, an electric memory medium, such as a read-only memory, a random access memory, or a flash memory, may be used as the memory element.

Another exemplary embodiment according to the present invention relates to a computer program suitable for executing an exemplary method according to the present invention, for example, on a microprocessor. The computer program may be stored on a memory element, for example, a read-only memory, a random access memory, or a flash memory.

An exemplary device according to the present invention, includes:

decentralized monitoring functions provided in the individual functions of the system for monitoring the functioning of the individual functions, and at least one higher-level monitoring instance in addition to the individual function for coordinating the monitoring functions.

DETAILED DESCRIPTION

An exemplary embodiment according to the present invention relates to a particular function-dependent horizontal structure of a monitoring method for monitoring the functioning of a system. This system may be designed, for example, as an automotive control device, for example, an electric battery management (EBM) control device. The system includes subsystems, which may be developed from one computer or an ASIC (application specific integrated circuit). In addition, this system may include, for example, functions, such as electric battery management functions, a battery simulator, etc. Further, this system includes hardware components and may include, for example, actuators or sensors.

At a minimum, a monitoring method or device should recognize when the system is no longer performing as specified. Ideally, the method or device should ensure, or at least make more probable, that the system is performing as specified when faults occur. This may require that redundancies be provided, which are generally economically feasible only in systems classified as relevant to safety. For systems in the area of electric battery management, monitoring of the system may therefore be limited to detecting when the system is no longer performing as specified.

The term "specification" refers to the sum of all requirements made of the system. Requirements may include, for example, "fail safe," "fault tolerance," "functional safety" or "a control device of unlimited functionality for operating voltages between, for example, 6 volts and 20 volts."

Since these requirements may be different for each system, a generally valid monitoring method, such as that according to an exemplary embodiment of present invention, may be flexibly applicable to different systems having different requirements. This requires a corresponding function structure, which permits the monitoring components to be used for different systems, even if they meet different requirements with regard to safety.

The monitoring method is performed in parallel to the actual control or regulating process of the system and should not restrict the function of the latter, e.g., by using computing capacity. The system may react directly to results of this monitoring (faults). In addition, the faults may be stored, for example, in a fault memory, and used for a fault analysis.

The sending of stored faults for analysis may relate to diagnosis, for which purpose, a suitable interface may be required. A suitable diagnostic tester may be connected to the system via this interface so that data may flow from the diagnostic tester into the system and out of the system into the diagnostic tester.

Diagnosis of faults may be performed in a workshop using a diagnostic tester. However, the diagnostic functions may be integrated into the control device and retrieved during intended operation of the control device. a Diagnosis may permit:

reading from and erasing the fault memory, reading output variables of selected functions (e.g., sensor signals), altering the value of input variables of selected functions (e.g., for controlling an actuator), and storing control device-specific data (e.g., serial numbers).

In addition, diagnosis includes the calculation of historical data, i.e., data series compiled over a relatively long period of time. This data may be needed for analysis of the system performance (data supporting development). Historical data may not be necessary for the function of the system.

Figure 1:
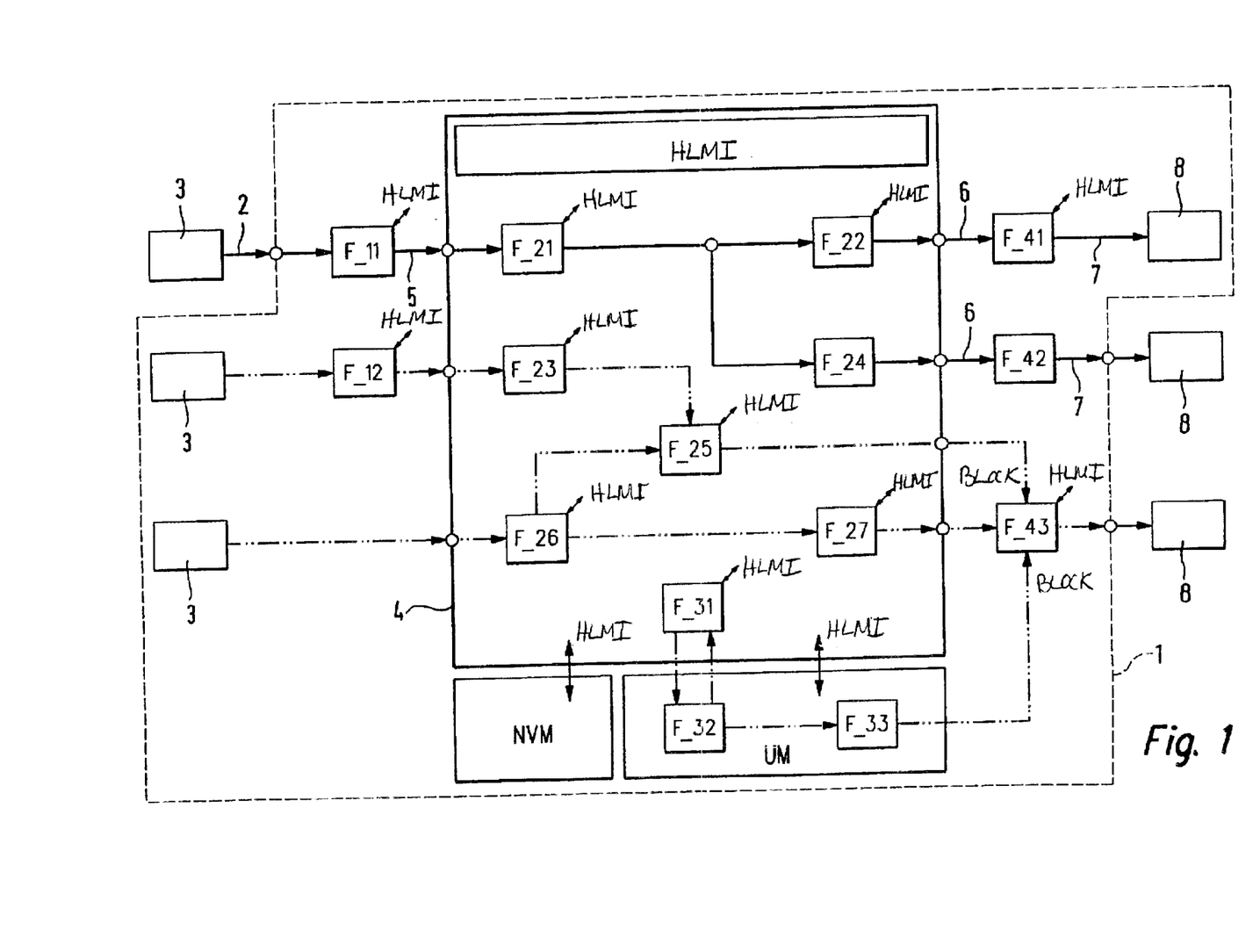
FIG. 1 is a block diagram showing various functions within a system to be monitored by an exemplary method according to the present invention.

FIG. 1 shows a structure of a system 1 designed as an EBM control device. Each system 1 is characterized by its functions F_ij. The flow of information between functions F_ij is represented by lines, solid lines for monitoring of low-priority functions and dotted lines for monitoring all other (high-priority) functions. In the case of functions F_ij, it is not necessary to differentiate between the type of implementation (hardware or software) at this level. All functions F_ij have the same function structure as that described below with reference to FIG. 2.

As shown in FIG. 1, functions F_ij are arranged so that signal processing proceeds from left to right. Control device 1 receives input signals 2 from sensors 3. If system 1 is an EBM control device, an input variable 2 may be, for example, the battery voltage. Sensor 3 may then be, for example, a voltmeter for detecting the battery voltage. In signal processing functions F_11, F_12, input signals 2 are converted to a format usable by a microprocessor 4 of control device 1. In the case of the EBM control device, for example, a voltage divider may be provided, dividing the battery voltage down to a level suitable for microprocessor 4. The input variable for microprocessor 4 is labeled with reference numeral 5. Input variables 5 are processed further by microprocessor 4, according to the requirements of control device 1, to yield suitable output variables 6. For processing input variables 5 to generate output variables 6, various functions F_21, F_22, F_23, F_24, F_25, F_26 and F_27 are provided in microprocessor 4. In the case of the EBM control device, the voltage input by microprocessor 4 is used as an input variable for an algorithm, the result of which is used to write to an output port of the microcomputer. Output variable 6 of microprocessor 4 should execute a signal processing function F_41, F_42 and F_43 before a suitable output signal 7 is available. In the case of the EBM control device, the signal processing may include, for example, an amplification of output variables 6 of microprocessor 4 to control an actuator 8, for example, an alternator regulator.

All the monitoring components (monitoring functions MF) within control device 1 and within functions F_ij of control device 1 are represented as hatched areas of functions F_ij having a communication link to a higher-level monitoring instance (HLMI). An exemplary embodiment according to the present invention assigns the monitoring functionality directly to individual functions F_ij of control device 1. Monitoring functions MF are distributed over the entire system. In the case of the EBM control device, the voltage information in the microprocessor, in the case of the "voltage measurement" function, may be checked for a minimum and maximum voltage directly at the function, purely on the basis of the function input variables. This monitoring function is integrated into the "voltage measurement" function. Whether and to what extent a function F_ij should be monitored is determined individually for each function. An exemplary embodiment according to the present invention, thus, permits the division of the monitoring method among multiple monitoring functions, each being assigned to one function F_ij to be monitored.

Control device 1 includes a redundant monitoring unit outside the computer, for example, a monitoring module MM, by which the function of microprocessor 4 may be checked for correctness. This check is performed because microprocessor 4 may be responsible for execution of a predominant number of functions F_ij of control device 1 and thus also for the execution of monitoring functions MF.

Each monitoring function MF supplies a status to a central location, i.e., the higher-level monitoring instance HLMI. The status information of all monitored functions F_ij is available at this central location. This permits a more comprehensive monitoring than that which may be possible directly at a monitoring function MF.

Higher-level monitoring instance HLMI considers the status of a function F_ij and may set this status in relation to status information of other functions F_ij. In the case of the EBM control device, analyzing the result of the self-diagnosis of a driver module permits monitoring of the outputs of this module. When the voltage drops below a minimum voltage, which may be detectable by undervoltage monitoring, for example, the module self-diagnosis fails, however, and delivers a fault entry that may not be accurate. Thus, this inaccurate fault entry should not considered, unless an undervoltage fault has been discovered immediately before the module fault occured. This information link is accomplished through the higher-level monitoring instance HLMI.

In addition, the higher-level monitoring instance HLMI supplies structures, which may be used for fault processing for detectable faults. This includes fault status recognition, compilation of the required information on faults and the mechanism of transferring storage of faults from a volatile memory to a nonvolatile memory NVM.

Figure 2:
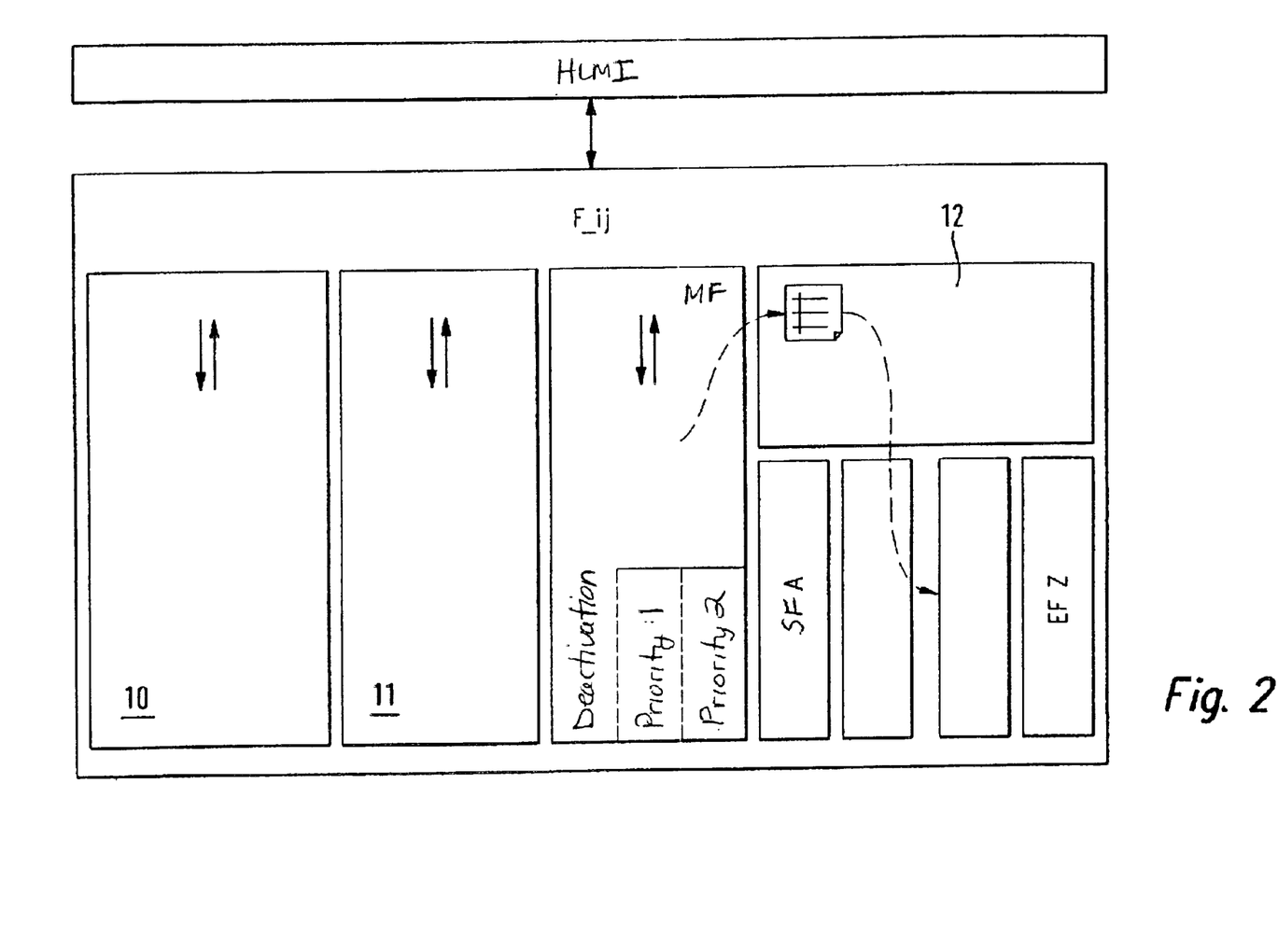
FIG. 2 is a block diagram showing a function structure specified by an exemplary monitoring method according to the present invention.

The individual components of this control device structure are described in detail below. FIG. 2 shows the function structure specified by an exemplary monitoring method according to the present invention, with which desired functions F_ij of a control device 1 may be describable. It is believed that this uniform function structure has the advantage in that it permits the simple interchangeability of functions F_ij together with respective monitoring function MF within system 1. System 1 is thus modularly constructed from various functions F_ij.

Each function F_ij contains a core functionality 10, i.e., the intended task of the function F_ij. Core functionality 10 may send and receive information and exchange information with other functions F_ij (not shown), which are represented by the double arrow in the upper area of function block 10. In addition, a service functionality 11 forms an interface between core functionality 10 and a diagnostic tester. Via this interface, the actual output variables of core functionality 10 may be read, and certain internal variables of function F_ij, which are not output in normal operation, may also be read; in addition, the output variables of selected functions F_ij may be influenced by the diagnostic tester.

As the third structure element, monitoring functionality MF is contained in function F_ij. Through monitoring functionality MF, the input variables of the core functionality, the output variables of the core functionality, or both are monitored for certain criteria. These criteria should be defined individually for each function F_ij. Before a fault is ascertained, the following steps should be performed:

Before initiating the monitoring of a function F_ij, certain input conditions for the check should first be satisfied. Input conditions are conditions under which monitoring may only be performed to avoid unfounded fault detection and fault entries. For example, if a switchable sensor path is to be monitored, a condition indicating that the sensor must be switched to active at the time of the test is an input condition.

In addition, the test conditions should be specified and the duration during which an interference should be recognized as active before a fault is detected or entered should be defined.

The service functionality 11 and monitoring functionality MF may exchange information with higher-level monitoring instance HLMI, which is indicated by the double arrows in the upper portion of function blocks 11 and MF.

The status signal of monitoring function MF, which, for example, may supply information regarding whether a fault has occurred in function F_ij, may be queried by one of downstream functions F_ij via higher-level monitoring instance HLMI. The characterization of monitoring function MF depends on the priority assigned to core function 10 within system 1. The priority depends on whether function F_ij is capable of placing system 1 in an state above a preselectable limiting risk, in the event of a fault. The limiting risk should be defined individually for each system 1.

If a fault is detected, suitable countermeasures, i.e., a substitute functionality SF should be executed. In the case of the EBM control device, the algorithm for calculating non-measurable battery variables may contain the fault information indicating that one or more of its input variables are implausible. Then, the algorithm uses predetermined substitute values. In this case, the substitute functionality thus includes using substitute values in the case of a fault.

The substitute functionality to be executed is selected as a function of the result of monitoring function MF from a list 12. Then the sequence branches from list 12 to corresponding substitute functionality SFA, SFB, . . . , SFZ and executes the substitute functionality.

Figure 3:
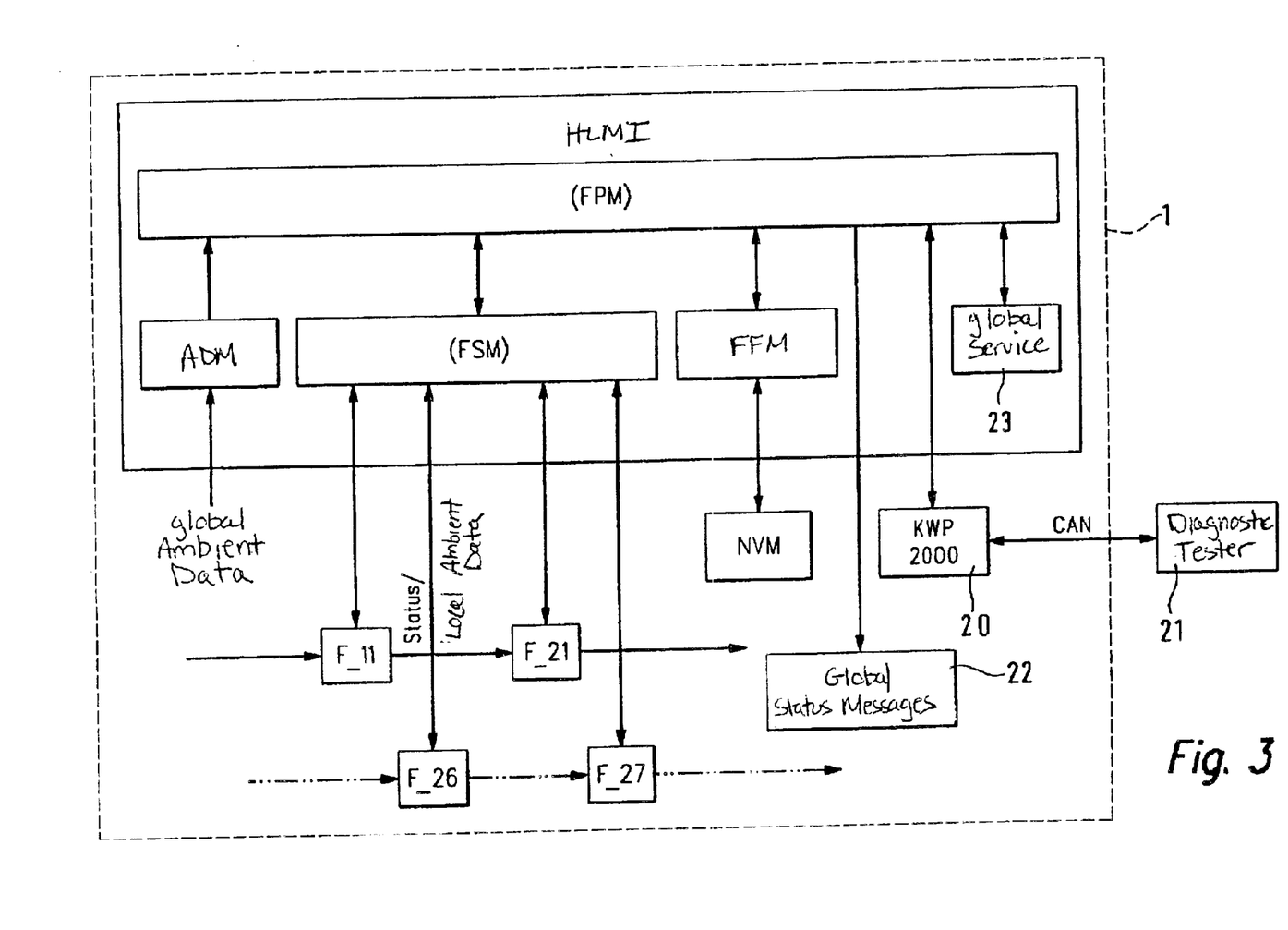
FIG. 3 is a block diagram showing a structure element of a higher-level monitoring instance of an exemplary monitoring method according to the present invention.

Higher-level monitoring instance HLMI is described in detail below with reference to FIG. 3. The higher-level monitoring instance HLMI performs multiple tasks, such as detecting and archiving all detectable faults of control device 1 for a subsequent fault analysis.

The fault path manager FPM is the central unit for compiling all the required data assigned to a certain fault. Each detectable fault should be unambiguously identifiable, e.g., by a fault number. The type of fault should be detected, certain additional information for evaluation of the fault should be stored with that fault, and certain fault-specific sequences should be known. This information is compiled in a fault path and continuously updated by fault path manager FPM for each fault.

A fault status manager FSM determines whether a fault has occurred, and if so, which type of fault it is. All the status information of the detectable faults is known to fault status manager FSM. A change in status results in transfer of the status information to the corresponding fault path by fault path manager FPM.

Certain additional information (e.g., ambient data AD), is assigned to each fault. Ambient data AD may include selected state variables of system 1, e.g., the temperature or speed, which may be supplied by an ambient data manager ADM in updated form and stored by fault path manager FPM in the fault path at the correct time for occurrence of the fault. A distinction may be made between ambient data AD stored with each fault and ambient data AD stored only with selected faults.

The fault paths compiled in this manner are stored in a volatile memory and are written to a nonvolatile memory NVM only for certain system states. The fault memory may be, for example, an EEPROM (electronically erasable and programmable read-only memory). To avoid an unnecessarily high number of memory accesses to nonvolatile memory NVM, access to memory NVM occurs only when necessary. The fault memory manager FMM performs this coordination and controls data flow to and from memory NVM.

To send the archived data for analysis, fault path manager FPM provides a suitable interface 20. This interface 20 may be based, for example, on a KWP-2002 protocol (ISO/DIS 14230-4). This interface 20 may permit a suitable diagnostic tester 21 to be driven, thereby permitting data flow between control device 1 and diagnostic tester 21. In addition to reading and erasing fault memory NVM, this interface 20 may also read the output variables of selected functions (e.g., sensor variables), altering the value of input variables of selected functions (e.g., for controlling an actuator), and storing control device-specific data (e.g., the serial number).

Another interface 22 makes global status information available to other control devices, depending on the faults detected. This may be used, for example, to control displays on the dashboard and for output of faults to the driver of a motor vehicle.

Another task of the higher-level monitoring instance HLMI is global service 23 (i.e., functions that are used exclusively for analysis of the system performance and are not needed for proper operation of control device 1). This includes all historical data over the entire lifetime of the control device, such as the average zero-signal current of control device 1.

Figure 4:
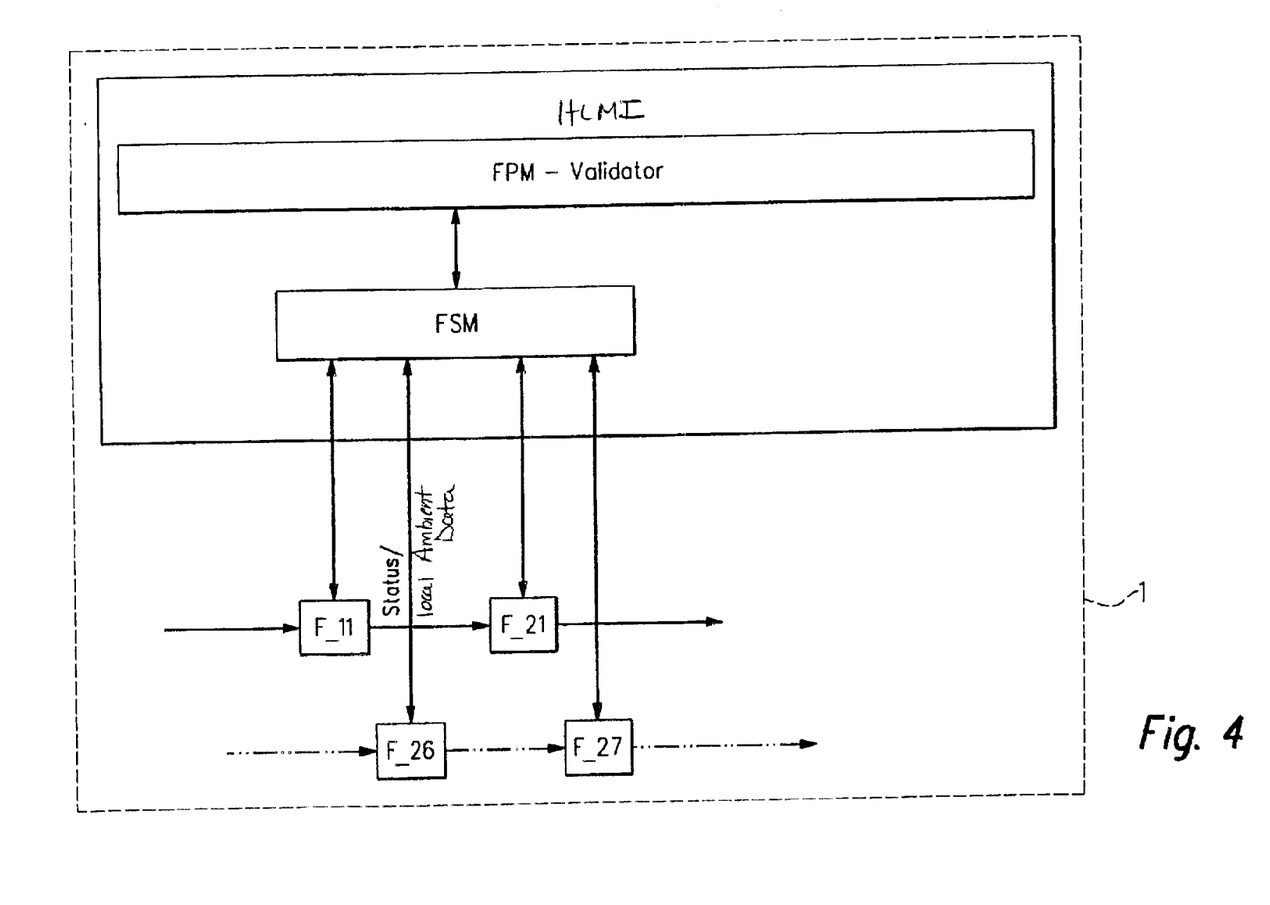
FIG. 4 is a block diagram showing further detail of the higher-level monitoring instance of FIG. 3.

FIG. 4 shows an additional functionality of higher-level monitoring instance HLMI as a fault path manager (FPM) validator. The FPM validator detects and prevents subsequent faults. The validator prevents fault entries caused by other faults (subsequent fault detection) from being stored in fault memory NVM. In the case of the EBM control device, the outputs of a driver module are monitored by analyzing the result of self-diagnosis of this module. When the voltage drops below a minimum voltage level detectable by an undervoltage monitor, however, the module self-diagnosis fails and supplies an inaccurate fault entry. This fault entry must not be considered because it is based on a different fault than the one detected. A fault entry should thus be disregarded if an undervoltage fault has been detected immediately before occurrence of the module fault. This information link is accomplished by the FPM validator.

Figure 5:
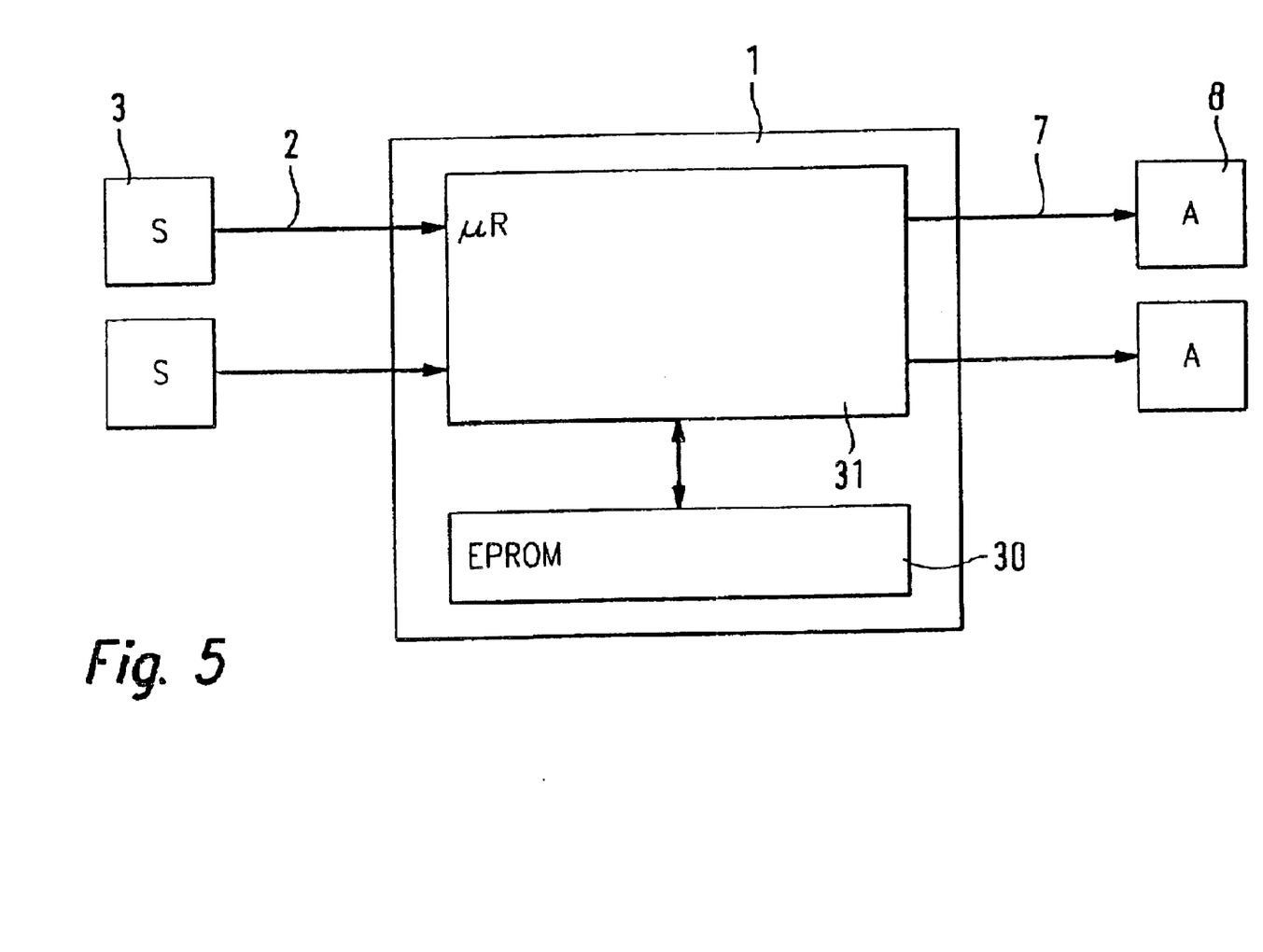
FIG. 5 is a block diagram showing a system on which an exemplary monitoring method according to the present invention may execute.

FIG. 5 shows a system 1 as a control device, the functioning of which is monitorable on the basis of an exemplary method according to the present invention. Control device 1 includes a memory element 30, for example, an electric memory medium, for example, an erasable and programmable read-only memory (EPROM). A computer program suitable for executing the exemplary monitoring method according to the present invention on a computer 31 of control device 1 is stored on memory element 30. Computer 31 may include, for example, a microprocessor. To execute the computer program on computer 31, the program is transferred either as a whole or by command from memory element 30 to computer 31.

The structuring of an exemplary monitoring method according to the present invention may be implemented in the computer program, for example, so that a monitoring function is assigned to each function of the system to be monitored, and a higher-level monitoring instance coordinates the monitoring functions.

What is claimed is:

1. A method of monitoring a functioning of a system, the method comprising:
   checking input signals, output signals and functions of the system, wherein the system includes lower-level subsystems or is a component of a higher-level system, the system includes components implemented as hardware, the components including at least one of sensors, actuators and function computers, and the system is divided into individual functions;
   providing via the monitoring functions status information to at least one higher-level, functions-overreaching monitoring instance, the monitoring instance at least partially combining the status information;
   wherein the monitoring method is structured to provide a plurality of decentralized monitoring functions provided in the individual functions of the system for monitoring the functioning of the individual functions, and to provide the at least one higher-level, functions-overreaching monitoring instance for coordinating the monitoring functions, and
   wherein the at least one higher-level, functions-overreaching monitoring instance coordinates an administration of a fault memory.

2. The method of claim 1, wherein the plurality of decentralized monitoring functions are organized into hierarchical structures.

3. The method of claim 1, further comprising:
   performing substitute measures if the functioning of the system is faulty, the substitute measures being freely configurable for a respective faulty function.

4. The method of claim 1, further comprising:
   performing substitute measures if the functioning of the system is faulty, the substitute measures being performed in closest possible proximity to a respective one of the functions of the system that has been determined to be faulty by an assigned one of the plurality of decentralized monitoring functions.

5. The method of claim 1, wherein the at least one higher-level, functions-overreaching monitoring instance one of requests and queries a status of monitoring in individual ones of the multiple decentralized monitoring functions.

6. The method of claim 1, wherein the at least one higher-level, functions-overreaching monitoring instance relays a status of monitoring of individual ones of the plurality of decentralized monitoring functions to a diagnostic tester unit.

7. The method of claim 1, wherein the at least one higher-level, functions-overreaching monitoring instance makes available an interface for connecting a diagnostic testing unit for targeted triggering of individual components of the system.

8. The method of claim 1, wherein the plurality of decentralized monitoring functions locally detect relevant local ambient data for individual ones of the functions of the system, and the plurality of decentralized monitoring functions relay the relevant local ambient data to the at least one higher-level, functions-overreaching monitoring instance.

9. The method of claim 1, wherein administration of the fault memory includes writing and reading entries into the fault memory.

10. The method of claim 2, wherein a higher-level monitoring function of the plurality of decentralized monitoring functions queries the status of the input signals in a lower-level monitoring function of the plurality of decentralized monitoring functions.

11. A method of monitoring a functioning of a system, the method comprising:
   checking input signals, output signals and functions of the system, wherein the system includes lower-level subsystems or is a component of a higher-level system, the system includes components implemented as hardware, the components including at least one of sensors, actuators and function computers, and the system is divided into individual functions;
   providing via the monitoring functions status information to at least one higher-level, functions-overreaching monitoring instance, the monitoring instance at least partially combining the status information;
   wherein the monitoring method is structured to provide a plurality of decentralized monitoring functions provided in the individual functions of the system for monitoring the functioning of the individual functions, and to provide the at least one higher-level, functions-overreaching monitoring instance for coordinating the monitoring functions, and wherein the at least one higher-level, functions-overreaching monitoring instance centrally detects global ambient data and stores the global ambient data and a detected fault in a fault memory.

12. The method of claim 11, wherein the at least one higher-level, functions-overreaching monitoring instance coordinates an administration of a fault memory.

13. The method of claim 12, wherein administration of the fault memory includes writing and reading entries into the fault memory.

14. A memory element for a device for monitoring a functioning of a system, the system one of including a lower-level subsystem and being a component of a higher-level system, the system further including hardware components, including at least one of sensors, actuators and function computers, the memory element comprising:

a memory storage arrangement to store a computer program executable on a computer, the computer program operable to perform the following:

checking input signals, output signals, and functions of the system, wherein the system is divided into individual functions;

providing via the monitoring functions status information to at least one higher-level, functions-overreaching monitoring instance, the monitoring instance at least partially combining the status information;

wherein the monitoring method is structured to provide a plurality of decentralized monitoring functions provided in the individual functions of the system for monitoring the functioning of the individual functions, and to provide the at least one higher-level, functions-overreaching monitoring instance for coordinating the monitoring functions, and wherein the at least one higher-level, functions-overreaching monitoring instance coordinates an administration of a fault memory.

15. The memory element of claim 14, wherein in the memory storage arrangement includes at least one of a read-only memory, a random access memory, and a flash memory.

16. The memory element of claim 14, wherein the computer includes a microprocessor.

17. A computer program for execution on a computer, comprising:

a program fragment operable to perform the following when executed on the computer:

checking input signals, output signals, and functions of a system, the system one of including a lower-level subsystem and being a component of a higher-level system, the system further including hardware components, including at least one of sensors, actuators and function computers, wherein the system is divided into individual functions;

providing via the monitoring functions status information to at least one higher-level, functions-overreaching monitoring instance, the monitoring instance at least partially combining the status information;

wherein the monitoring method is structured to provide a plurality of decentralized monitoring functions provided in the individual functions of the system for monitoring the functioning of the individual functions, and to provide the at least one higher-level, functions-overreaching monitoring instance for coordinating the monitoring functions, and wherein the at least one higher-level, functions-overreaching monitoring instance coordinates an administration of a fault memory.

18. The computer program of claim 17, wherein the computer program is stored at a memory element.

19. The computer program of claim 17, wherein the computer includes a microprocessor.

20. A memory element for a device for monitoring a functioning of a system, the system one of including a lower-level subsystem and being a component of a higher-level system, the system further including hardware components, including at least one of sensors, actuators and function computers, the memory element comprising:

a memory storage arrangement to store a computer program executable on a computer, the computer program operable to perform the following:

checking input signals, output signals, and functions of the system, wherein the system is divided into individual functions;

providing via the monitoring functions status information to at least one higher-level, functions-overreaching monitoring instance, the monitoring instance at least partially combining the status information;

wherein the monitoring method is structured to provide a plurality of decentralized monitoring functions provided in the individual functions of the system for monitoring the functioning of the individual functions, and to provide the at least one higher-level, functions-overreaching monitoring instance for coordinating the monitoring functions, and wherein the at least one higher-level, functions-overreaching monitoring instance centrally detects global ambient data and stores the global ambient data and a detected fault in a fault memory.

21. A computer program for execution on a computer, comprising:

a program fragment operable to perform the following when executed on the computer:

checking input signals, output signals, and functions of a system, the system one of including a lower-level subsystem and being a component of a higher-level system, the system further including hardware components, including at least one of sensors, actuators and function computers, wherein the system is divided into individual functions;

providing via the monitoring functions status information to at least one higher-level, functions-overreaching monitoring instance, the monitoring instance at least partially combining the status information;

wherein the monitoring method is structured to provide a plurality of decentralized monitoring functions provided in the individual functions of the system for monitoring the functioning of the individual functions, and to provide the at least one higher-level, functions-overreaching monitoring instance for coordinating the monitoring functions, and wherein the at least one higher-level, functions-overreaching monitoring instance centrally detects global ambient data and stores the global ambient data and a detected fault in a fault memory.

* * * * *